(12) United States Patent
Lin et al.

(10) Patent No.: US 11,657,524 B2
(45) Date of Patent: May 23, 2023

(54) IMAGE CAPTURING AND DEPTH ALIGNMENT METHOD

(71) Applicant: JORJIN TECHNOLOGIES INC., New Taipei (TW)

(72) Inventors: Wen-Hsiung Lin, New Taipei (TW); Chih-Yuan Chu, New Taipei (TW); Kai-Pin Tung, New Taipei (TW)

(73) Assignee: JORJIN TECHNOLOGIES INC., New Taipei (TW)

( * ) Notice: Subject to any disclaimer, the term of this patent is extended or adjusted under 35 U.S.C. 154(b) by 241 days.

(21) Appl. No.: 17/142,256

(22) Filed: Jan. 6, 2021

(65) Prior Publication Data

US 2022/0028097 A1    Jan. 27, 2022

(30) Foreign Application Priority Data

Jul. 21, 2020   (TW) .................................. 109124569

(51) Int. Cl.
*G06T 7/521* (2017.01)
*G06T 7/33* (2017.01)
*H04N 13/122* (2018.01)
*H04N 13/167* (2018.01)

(52) U.S. Cl.
CPC ............... *G06T 7/521* (2017.01); *G06T 7/33* (2017.01); *H04N 13/122* (2018.05); *H04N 13/167* (2018.05)

(58) Field of Classification Search
None
See application file for complete search history.

(56) References Cited

U.S. PATENT DOCUMENTS

| | | | |
|---|---|---|---|
| 2017/0146799 A1* | 5/2017 | Oh | B60R 1/00 |
| 2018/0124387 A1* | 5/2018 | Zhao | H04N 13/344 |
| 2021/0117659 A1* | 4/2021 | Foroozan | G06T 7/74 |

* cited by examiner

*Primary Examiner* — Xiaolan Xu
(74) *Attorney, Agent, or Firm* — Leong C. Lei

(57) ABSTRACT

An image capturing and depth alignment method includes radar scanning step, image capturing step, translation and synchronization step, alignment step, client detection step, client positioning step, scene map construction step, view image transmitting step, view image processing step, virtual object placement step. through translating, synchronizing, and aligning the radar scanning step's 3D point cloud map and the image capturing step's planar image of the scene, the back-end server therefore obtains surveillance information with both image and depth. Then, through positioning, multiply superimposing, image rotation and matching, speed comparison, uniformization of coordinate systems, and display through the smart glasses, a wearer of the smart glasses may be positioned and tracked in the scene. The wearer may also be instructed to reach a specific target or place of a specific object.

1 Claim, 7 Drawing Sheets

IMAGE CAPTURING AND DEPTH ALIGNMENT METHOD

BACKGROUND OF THE INVENTION

(a) Technical Field of the Invention

The present invention is generally related to video surveillance, and more particular to an image capturing and depth alignment method.

(b) Description of the Prior Art

Ordinary surveillance systems, such as those cameras at street corners, CCTVs, and web cams, captures a series of optical images for later review map.

The captured images, however, do not include spatial information such as depths and distances. It is sometimes difficult to access a certain object, such as a control box, a workstation, and a valve, in the scene, as one can base only on rough locations obtained from viewing the object's recorded images. Not only that a wrong place may be searched, but also that, unless the object is clearly marked, it may take quite some time to locate the object.

SUMMARY OF THE INVENTION

To obviate the above shortcomings, an objective of the present invention is to provide a method for image capturing and depth alignment.

To achieve the objective, the method includes the following steps:

Radar scanning step: producing a steam of data points constituting a 3D point cloud map of a scene through at least a millimeter-wave radar. The scene is assigned with an absolute coordinate system and each millimeter-wave radar is assigned with a first relative coordinate system. The 3D point cloud map's stream of data points is obtained by the millimeter-wave radar's transmitting and receiving millimeter wave to and from the scene and the data points are associated with precise stereoscopic information such as length, height, depth, distance, etc. The 3D point cloud map's stream of data points does not require complex computation. The millimeter wave is used as it is robust to environmental influence.

Image capturing step: producing a steam of image points constituting a planar image of the scene through at least an optical camera. The image capturing step and the radar scanning step are conducted simultaneously. The image points provide optical information to the scene. Each optical camera is assigned with a second relative coordinate system.

Translation and synchronization step: translating the steam of data points and the stream of image points by superimposing the first and second relative coordinate systems on the absolute coordinate system, and synchronizing the steam of data points and the stream of image points so that they are synchronized for each part of the scene.

Alignment step: aligning the stream of data points and the stream of image points after they are processed by the translation and synchronization step and storing the stereoscopic information (e.g., length, height, depth, distance, etc.) from the aligned stream of data points with the aligned stream of image points in the back-end server. The back-end server therefore obtains surveillance information with both image and depth. The surveillance information also includes information about a hazardous zone.

Client detection step: detecting the movement, turn, pitch, and the related speeds and angles of a smart glasses by its wearer from an Inertial Measurement Unit (IMU) inside the smart glasses, and transmitting the various parameters from the IMU to the back-end server.

Client positioning step: obtaining a coordinate and an angle of the smart glasses within the scene by the back-end server through superimposing the various parameters in the various coordinate systems.

Scene map construction step: based on the coordinate and angle of the smart glasses within the scene, obtaining a scene map by the back-end server corresponding to what is covered by the viewing range of the smart glasses from matching the planar image of the scene to the coordinate and angle of the smart glasses.

View image transmitting step: transmitting a view image perceived by the smart glasses to the back-end server.

View image processing step: spatially aligning the view image and the scene map and uniformizing the coordinate systems by the back-end server. The spatial alignment involves the translation of coordinates, as follows:

$$sm'=A[R|t]M$$

s: Constant
m': Project Point
A: Camera Intrinsic Matrix
R: Rotation Matrix
t: Translation Matrix
M: Point Cloud Map Point The uniformization of coordinate systems involves finding center points respectively within 3D point cloud map and the scene, calculating the distances between various reference points of 3D point cloud map and the scene relative to the center points, keeping the ones of the smallest distances as the key reference points, obtaining and transmitting a spatial correspondence information between the 3D point cloud map and the scene to the smart glasses.

Virtual object placement step: determining the coordinate of a virtual object in the scene based on the spatial correspondence information between the 3D point cloud map and the scene and thereby placing the virtual object in the scene. As such, when the smart glasses changes its view following the wearer's movement, the virtual object remains at its place in the scene without moving along with the smart glasses. After the view change, the spatial correspondence information between the 3D point cloud map and the scene is re-calculated and renewed.

As described above, through translating, synchronizing, and aligning the radar scanning step's 3D point cloud map and the image capturing step's planar image of the scene, the back-end server therefore obtains surveillance information with both image and depth. Then, through positioning, multiply superimposing, image rotation and matching, speed comparison, uniformization of coordinate systems, and display through the smart glasses, a wearer of the smart glasses may be positioned and tracked in the scene. The wearer may also be instructed to reach a specific target or place of a specific object. Hazardous zones may be defined through the back-end server. The wearer may avoid hazard through the images and depth information transmitted from the back-end server. Schedules and operations may also be configured by the back-end server so that a user may proceed to a specific location and to perform the configured operations (e.g., checking, maintenance, repairment) on specific objects (e.g., machines, apparatuses, control boxes). The chances of operation error, equipment damage, and user injury may be reduced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
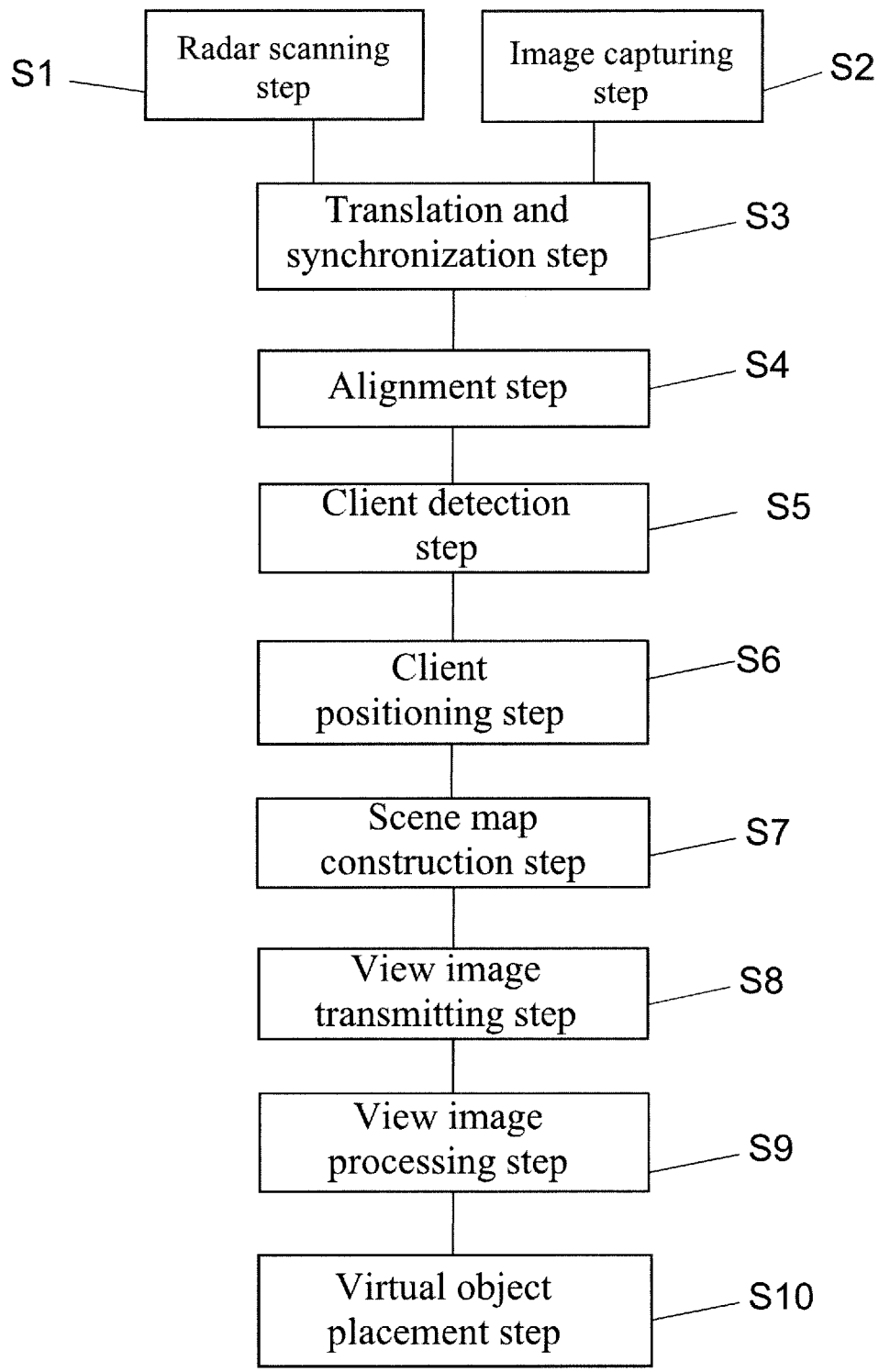
FIG. 1 is a flow diagram showing the step of an image capturing and depth alignment method according to an embodiment of the present invention.
Figure 2:
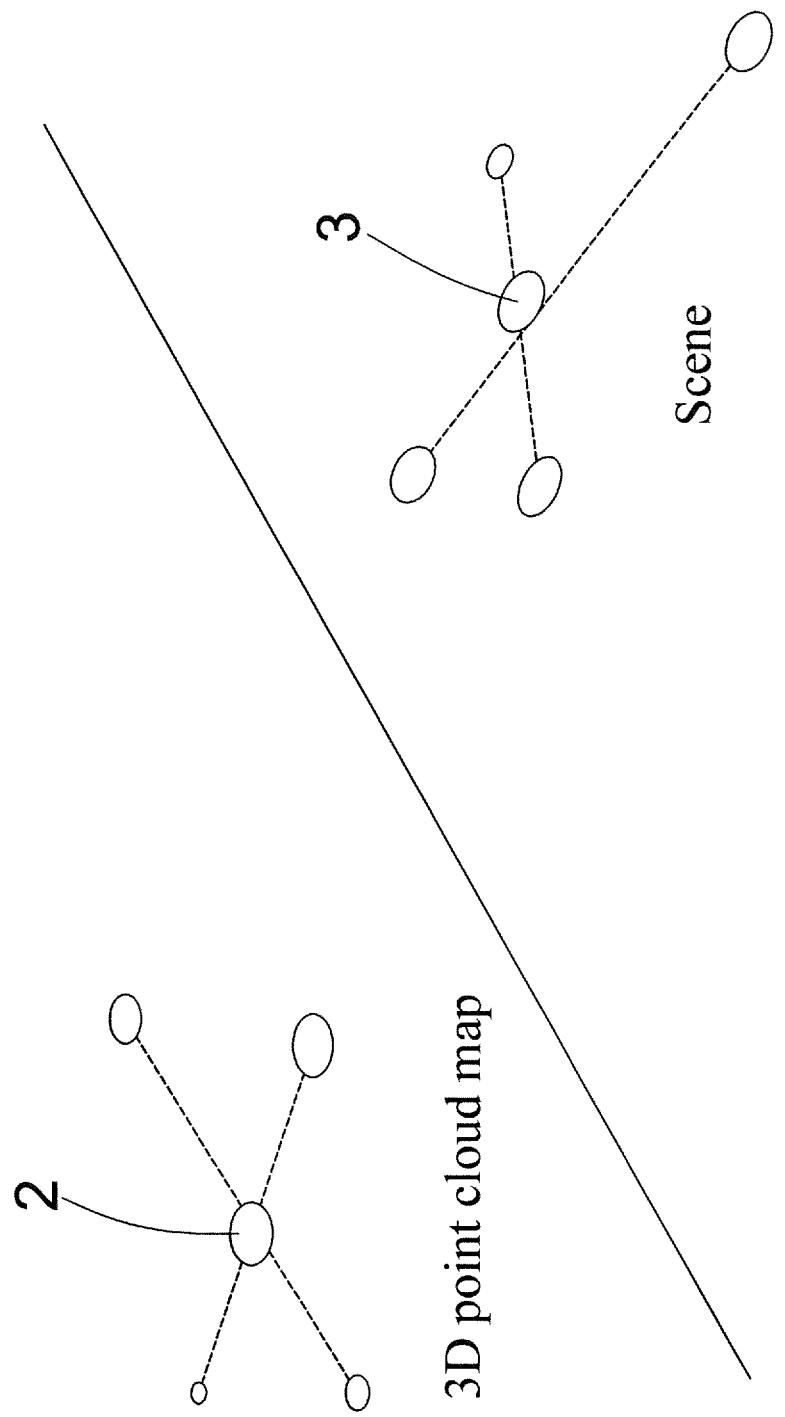
FIG. 2 is a schematic diagram showing a scene and a point cloud map produced by the method of FIG. 1 and their center points and reference points.
Figure 3:
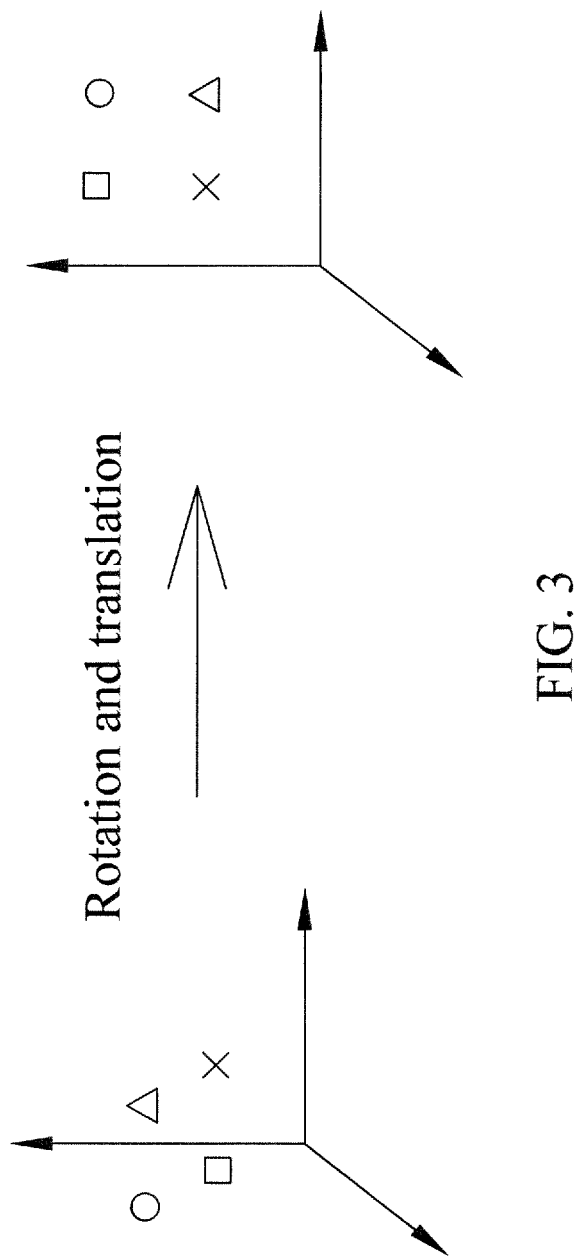
FIG. 3 is a schematic diagram showing coordinate translation and rotation.

FIG. 1 provides a flow chart showing the various steps of an image capturing and depth alignment method according to an embodiment of the present invention. As illustrated, the method includes the following steps.

Radar scanning step S1: producing a steam of data points constituting a 3D point cloud map of a scene through at least a millimeter-wave radar. The scene is assigned with an absolute coordinate system and each millimeter-wave radar is assigned with a first relative coordinate system. The 3D point cloud map's stream of data points is obtained by the millimeter-wave radar's transmitting and receiving millimeter wave to and from the scene and the data points are associated with precise stereoscopic information such as length, height, depth, distance, etc. The 3D point cloud map's stream of data points does not require complex computation. The millimeter wave is used as it is robust to environmental influence.

Image capturing step S2: producing a steam of image points constituting a planar image of the scene through at least an optical camera. The image capturing step S2 and the radar scanning step S1 are conducted simultaneously. The image points provide optical information to the scene. Each optical camera is assigned with a second relative coordinate system.

Translation and synchronization step S3: translating the steam of data points and the stream of image points by superimposing the first and second relative coordinate systems on the absolute coordinate system, and synchronizing the steam of data points and the stream of image points so that they are synchronized for each part of the scene.

Alignment step S4: aligning the stream of data points and the stream of image points after they are processed by the translation and synchronization step S3 and storing the stereoscopic information (e.g., length, height, depth, distance, etc.) from the aligned stream of data points with the aligned stream of image points in the back-end server. The back-end server therefore obtains surveillance information with both image and depth. The surveillance information also includes information about a hazardous zone.

Client detection step S5: detecting the movement, turn, pitch, and the related speeds and angles of a smart glasses 1 by its wearer from an Inertial Measurement Unit (IMU) inside the smart glasses 1, and transmitting the various parameters from the IMU to the back-end server.

Client positioning step S6: obtaining a coordinate and an angle of the smart glasses 1 within the scene by the back-end server through superimposing the various parameters in the various coordinate systems. The wearer may also be tracked and positioned in the scene.

Scene map construction step S7: based on the coordinate and angle of the smart glasses 1 within the scene, obtaining a scene map by the back-end server corresponding to what is covered by the viewing range of the smart glasses 1 from matching the planar image of the scene to the coordinate and angle of the smart glasses 1.

View image transmitting step S8: transmitting a view image perceived by the smart glasses 1 to the back-end server.

View image processing step S9: spatially aligning the view image and the scene map and uniformizing the coordinate systems by the back-end server. The spatial alignment involves the translation of coordinates, as follows:

$$sm'=A[R|t]M$$

s: Constant
m': Project Point
A: Camera Intrinsic Matrix
R: Rotation Matrix
t: Translation Matrix
M: Point Cloud Map Point The uniformization of coordinate systems involves finding center points 2 and 3 respectively within 3D point cloud map and the scene, calculating the distances between various reference points of 3D point cloud map and the scene relative to the center points 2 and 3, keeping the ones of the smallest distances as the key reference points, obtaining and transmitting a spatial correspondence information between the 3D point cloud map and the scene to the smart glasses 1.

Figure 4:
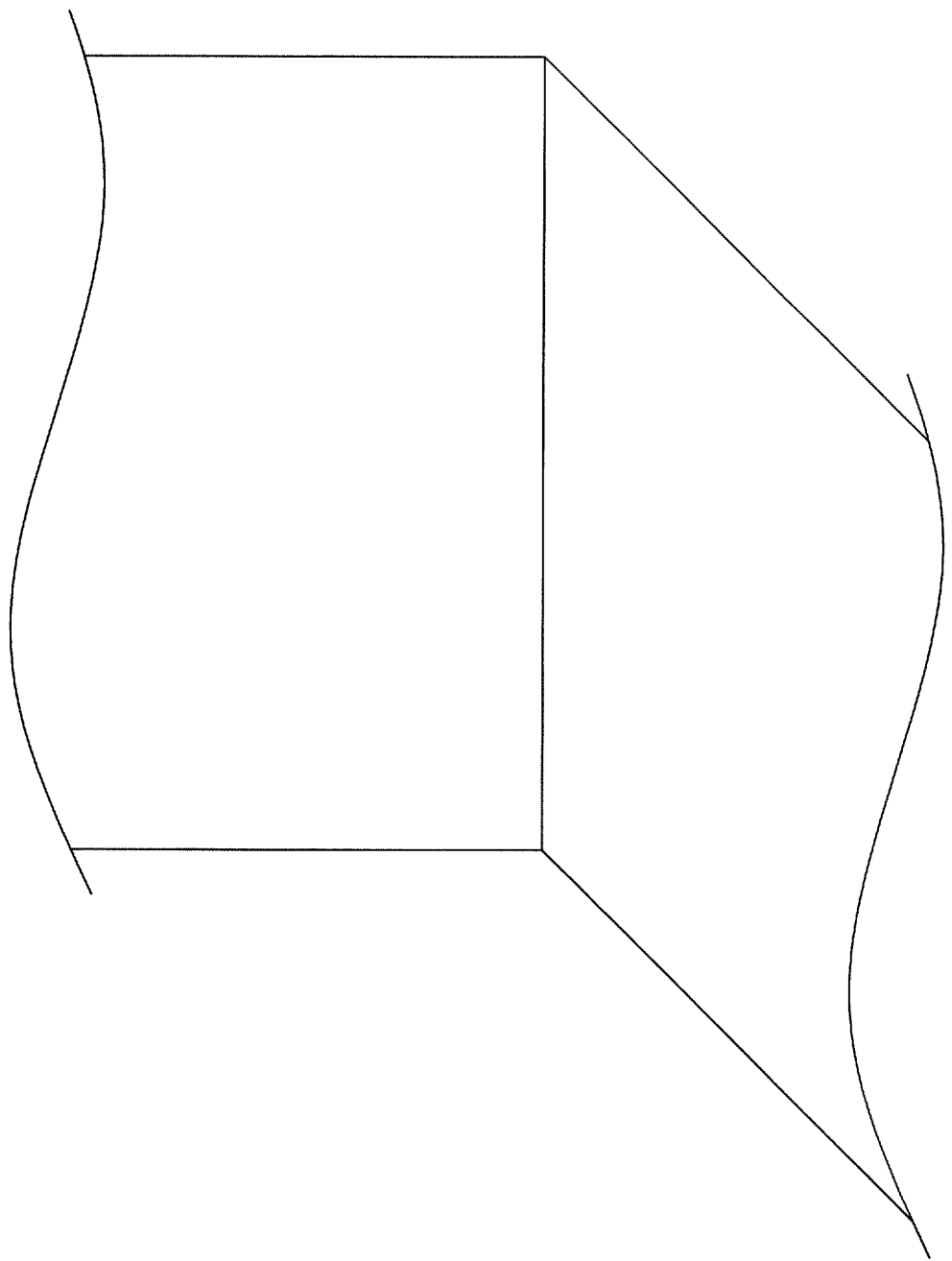
FIG. 4 is a schematic diagram showing a real space.
Figure 5:
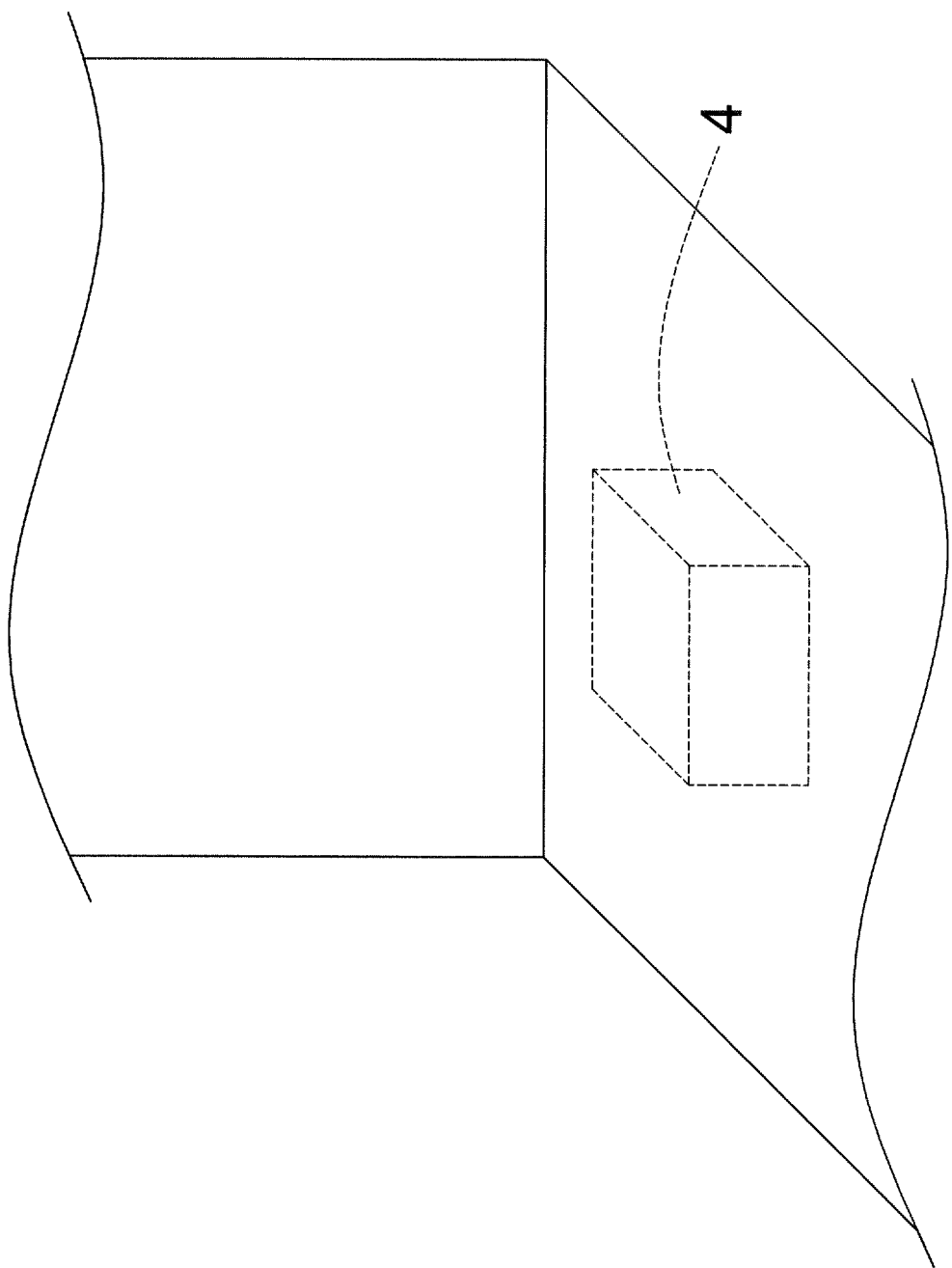
FIG. 5 is a schematic diagram showing a virtual object embedded in the real space of FIG. 4.
Figure 6:
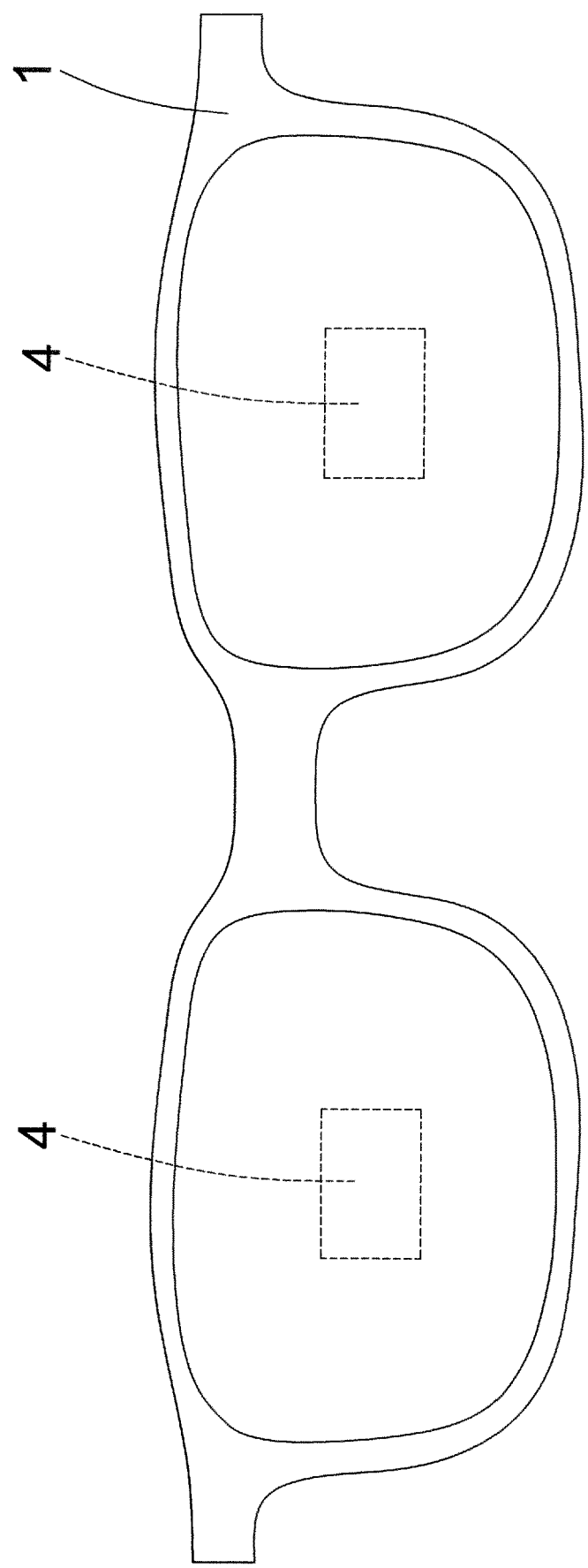
FIG. 6 is a schematic diagram showing the virtual object of FIG. 5 perceived in a smart glasses.
Figure 7:
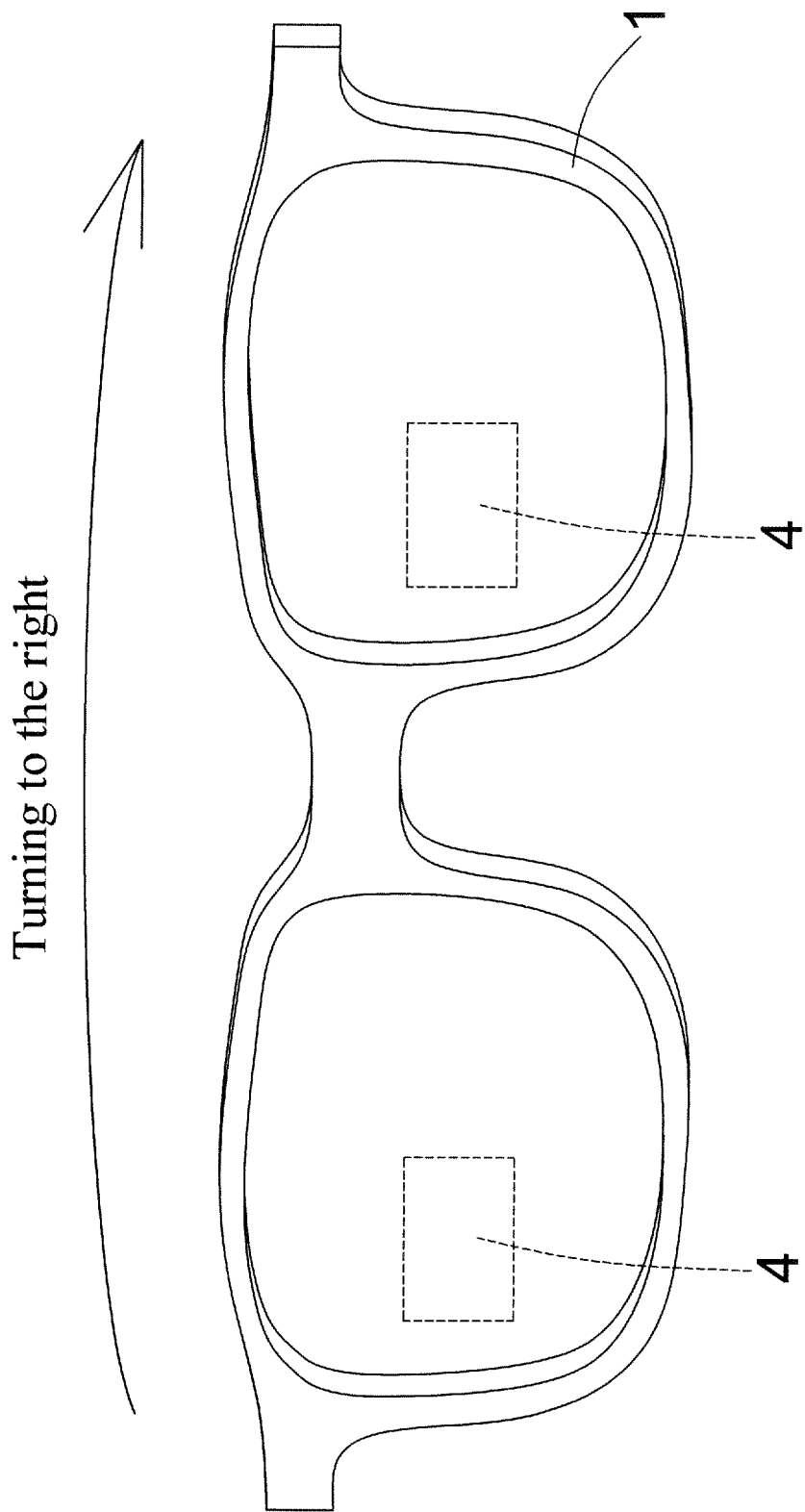
FIG. 7 is a schematic diagram showing the virtual object of FIG. 5 does not move along with the smart glasses.

Virtual object placement step S10: as shown in FIGS. 4 and 5, determining the coordinate of a virtual object in the scene based on the spatial correspondence information between the 3D point cloud map and the scene and thereby placing the virtual object 4 in the scene. As such, when the smart glasses 1 changes its view following the wearer's movement, the virtual object 4 remains at its place in the scene without moving along with the smart glasses 1, as shown in FIGS. 6 and 7. After the view change, the spatial correspondence information between the 3D point cloud map and the scene is re-calculated and renewed.

As described above, through translating, synchronizing, and aligning the radar scanning step S1's 3D point cloud map and the image capturing step S2's planar image of the scene, the back-end server therefore obtains surveillance information with both image and depth. Then, through positioning, multiply superimposing, image rotation and matching, speed comparison, uniformization of coordinate systems, and display through the smart glasses, a wearer of the smart glasses may be positioned and tracked in the scene. The wearer may also be instructed to reach a specific target or place of a specific object. Hazardous zones may be defined through the back-end server. The wearer may avoid hazard through the images and depth information transmitted from the back-end server. Schedules and operations may also be configured by the back-end server so that a user may proceed to a specific location and to perform the configured operations (e.g., checking, maintenance, repairment) on specific objects (e.g., machines, apparatuses, control boxes).

The chances of operation error, equipment damage, and user injury may be reduced.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. An image capturing and depth alignment method, comprising:

Radar scanning step: assigning an absolute coordinate system to a scene and producing a steam of data points constituting a 3D point cloud map of the scene through at least a millimeter-wave radar, where each millimeter-wave radar is assigned with a first relative coordinate system, and the stream of data points is associated with stereoscopic information;

Image capturing step: producing a steam of image points constituting a planar image of the scene through at least an optical camera, where each optical camera is assigned with a second relative coordinate system, and the stream of image points provides optical information to the scene;

Translation and synchronization step: translating the steam of data points and the stream of image points by superimposing the first and second relative coordinate systems on the absolute coordinate system, and synchronizing the steam of data points and the stream of image points so that they are synchronized for each part of the scene;

Alignment step: aligning the stream of data points and the stream of image points after they are processed by the translation and synchronization step and storing the aligned stream of data points and the aligned stream of image points in a back-end server, where the back-end server therefore obtains surveillance information with both image and depth, the stereoscopic information comprises at least one of length, height, depth, and distance, and the surveillance information comprises information about a hazardous zone;

Client detection step: detecting the movement of a smart glasses by its wearer from an Inertial Measurement Unit (IMU) inside the smart glasses, and transmitting various parameters from the IMU to the back-end server;

Client positioning step: obtaining a coordinate and an angle of the smart glasses within the scene by the back-end server through superimposing the various parameters in the various coordinate systems;

Scene map construction step: based on the coordinate and angle of the smart glasses within the scene, obtaining a scene map by the back-end server corresponding to what is covered by the viewing range of the smart glasses from matching the planar image of the scene to the coordinate and angle of the smart glasses;

View image transmitting step: transmitting a view image perceived by the smart glasses to the back-end server;

View image processing step: spatially aligning the view image and the scene map and uniformizing the coordinate systems by the back-end server, where the uniformization of coordinate systems involves finding center points respectively within 3D point cloud map and the scene, calculating the distances between various reference points of 3D point cloud map and the scene relative to the center points, keeping the ones of the smallest distances as the key reference points, obtaining and transmitting a spatial correspondence information between the 3D point cloud map and the scene to the smart glasses; and Virtual object placement step: determining the coordinate of a virtual object in the scene based on the spatial correspondence information between the 3D point cloud map and the scene and thereby placing the virtual object in the scene.

* * * * *